United States Patent
Kuk et al.

(10) Patent No.: US 9,817,260 B2
(45) Date of Patent: Nov. 14, 2017

(54) DISPLAY DEVICE AND METHOD OF FABRICATING THE SAME

(71) Applicant: Samsung Display Co., Ltd., Yongin-si, Gyeonggi-Do (KR)

(72) Inventors: Seung-Won Kuk, Cheonan-si (KR); Chunghui Lee, Cheongju-si (KR); Du-Yeon Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 81 days.

(21) Appl. No.: 14/750,178

(22) Filed: Jun. 25, 2015

(65) Prior Publication Data
US 2016/0091748 A1 Mar. 31, 2016

(30) Foreign Application Priority Data

Sep. 26, 2014 (KR) .................. 10-2014-0129227

(51) Int. Cl.
*G02F 1/1333* (2006.01)

(52) U.S. Cl.
CPC ............. *G02F 1/133308* (2013.01); *G02F 2001/133325* (2013.01); *G02F 2201/46* (2013.01)

(58) Field of Classification Search
CPC ................ G02F 1/133308; G02F 2201/46
See application file for complete search history.

(56) References Cited

U.S. PATENT DOCUMENTS

| 6,034,750 | A | * | 3/2000 | Rai | G02B 6/003 349/57 |
|---|---|---|---|---|---|
| 9,033,533 | B2 | | 5/2015 | Lee et al. | |
| 2007/0002535 | A1 | * | 1/2007 | Kim | H05K 7/20963 361/692 |
| 2008/0230207 | A1 | * | 9/2008 | Nakamura | E04B 2/7453 165/56 |
| 2009/0027583 | A1 | * | 1/2009 | McBroom | G06F 1/1601 349/58 |
| 2009/0231500 | A1 | * | 9/2009 | Ha | G02F 1/133504 349/12 |
| 2011/0042542 | A1 | * | 2/2011 | Russo | A47G 1/17 248/467 |
| 2012/0262907 | A1 | * | 10/2012 | Lee | H05K 5/02 362/97.1 |
| 2013/0176240 | A1 | * | 7/2013 | Autran | G06F 3/03547 345/173 |

(Continued)

FOREIGN PATENT DOCUMENTS

| JP | 2002-341388 A | 11/2002 |
|---|---|---|
| JP | 2007-017966 A | 1/2007 |

(Continued)

*Primary Examiner* — Sang V Nguyen
(74) *Attorney, Agent, or Firm* — H.C. Park & Associates, PLC

(57) ABSTRACT

A display device includes: a display panel including a display surface that displays an image and is exposed to the outside and a rear surface that is opposed to the display surface; a backlight unit formed at a lower part of the display panel and providing light to the display panel; a panel support member disposed between the display panel and the backlight unit and supporting an edge of the display panel; and a magnetic adhesive member disposed between the panel support member and the backlight unit and having magnetism.

15 Claims, 12 Drawing Sheets

(56) References Cited

U.S. PATENT DOCUMENTS

| | | | |
|---|---|---|---|
| 2014/0085907 A1* | 3/2014 | Jun | G09G 3/3208 362/362 |
| 2014/0118911 A1* | 5/2014 | Tang | G02F 1/133308 361/679.01 |
| 2014/0125911 A1* | 5/2014 | Lee | G02F 1/133308 349/58 |
| 2014/0184983 A1 | 7/2014 | Wu et al. | |
| 2014/0189982 A1* | 7/2014 | Li | A44B 99/00 24/303 |
| 2014/0198474 A1* | 7/2014 | Byeon | G02F 1/133308 361/809 |
| 2014/0375829 A1* | 12/2014 | Nishihara | G03B 5/00 348/208.7 |
| 2015/0248036 A1* | 9/2015 | Bu | G02F 1/133308 349/58 |
| 2016/0140882 A1* | 5/2016 | Doebelt | G09F 9/301 361/749 |

FOREIGN PATENT DOCUMENTS

| KR | 10-2007-0120672 A | 12/2007 |
|---|---|---|
| KR | 10-2012-0118372 A | 10/2012 |
| KR | 10-2013-0046240 A | 5/2013 |
| KR | 10-2014-0009953 A | 1/2014 |

\* cited by examiner

DISPLAY DEVICE AND METHOD OF FABRICATING THE SAME

CLAIM OF PRIORITY

This U.S. non-provisional patent application claims the priority and all the benefits accruing under 35 U.S.C. §119 of Korean Patent Application No. 10-2014-0129227, filed on Sep. 26, 2014 in the Korean Intellectual Property Office ("KIPO"), the entire contents of which are hereby incorporated by reference.

BACKGROUND OF THE INVENTION

1. Field of Disclosure

The present disclosure herein relates to a display device and a method of fabricating the same, and more particularly, to a display device without a top chassis and a method of fabricating the same.

2. Description of the Related Art

In recent years, various flat panel display devices that reduce the disadvantages of a cathode ray tube, that is, its weight and volume, have been developed. Flat plane display devices are used for displaying images on various information processing devices, such as TVs, monitors, notebooks, and mobile phones.

Recently, the necessities on the research and development in a design aspect of products that can be more appealing to consumers in addition to the research and development in a technical aspect of flat panel display devices have been emphasized particularly. Accordingly, the efforts for minimizing (slimming) the thickness of a display device are progressing steadily and the needs for an aesthetically enhanced design that stimulates the purchase of consumers by appealing to an aesthetic sense are being increased gradually.

Especially, since a top chassis covers the top edge of a liquid crystal display device essentially, the thickness of the liquid crystal device becomes thicker, its frame width is increased, and the stepped portion of a frame portion occurs. Consequently, these become obstacles in devising various and innovative designs as these cause problems such as increased manufacturing cost and complexity for thin display devices and limited viewing area at edge regions of the display devices.

SUMMARY OF THE INVENTION

The present disclosure provides a display device having a thin thickness and a narrow frame width without a top chassis.

The present disclosure also provides a method of fabricating a display device having a thin thickness and a narrow frame width without a top chassis.

Embodiments of the inventive concept provide display devices including: a display panel including a display surface that displays an image and is exposed to the outside and a rear surface that is opposed to the display surface; a backlight unit formed at a lower part of the display panel and providing light to the display panel; a panel support member disposed between the display panel and the backlight unit and supporting an edge of the display panel; and a magnetic adhesive member disposed between the panel support member and the backlight unit and having magnetism.

In some embodiments, the panel support member may support an edge of the rear surface.

In other embodiments, as seen from a thickness direction of the display panel, the panel support member may have a rectangular ring shape.

In still other embodiments, the magnetic adhesive member may be formed at an edge of a top of the backlight unit and when as seen from a thickness direction of the display panel, the magnetic adhesive member may have a rectangular ring shape.

In even other embodiments, the panel support member may include a first panel support member disposed between the display panel and the backlight unit; a second panel support member spaced apart from the first panel support member; a third panel support member connected to the first panel support member and the second panel support member; and a fourth panel support member spaced apart from the third panel support member.

In yet other embodiments, the magnetic adhesive member may include: a first magnetic adhesive member contacting the first panel support member; a second magnetic adhesive member contacting the second panel support member and spaced apart from the first magnetic adhesive member; a third magnetic adhesive member contacting the third panel support member and connected to the first magnetic adhesive member and the second magnetic adhesive member; and a fourth magnetic adhesive member contacting the fourth panel support member and spaced apart from the third magnetic adhesive member.

In further embodiments, the panel support member may include a plurality of sub panel support members disposed between the display panel and the backlight unit and spaced apart from each other.

In still further embodiments, the panel support member may include: a panel support bottom part formed at a lower part of the display panel; and a panel support side part vertically connected to the panel support bottom part and covering a side of the display panel.

In even further embodiments, the display devices may further include a mold frame disposed between the display panel and the backlight unit, wherein the magnetic adhesive member is disposed on the mold frame.

In yet further embodiments, the display devices may further include a bottom chassis formed at a lower part of the backlight unit and receiving the backlight unit, wherein the magnetic adhesive member may be disposed on the bottom chassis.

In yet further embodiments, the display device may further include a panel adhesive member allowing the display panel and the panel support member to adhere to each other.

In yet further embodiments, the panel support member may be a conductor.

In yet further embodiments, the panel support member may include metal.

In yet further embodiments, the magnetic adhesive member may be a magnet.

In other embodiments of the inventive concept, provided are methods of fabricating a display device. The methods include: attaching a panel support member that supports an edge of a display panel to a lower part of the display panel including a display surface that displays an image and is exposed to the outside and a rear surface opposed to the display surface; providing a magnetic adhesive member having magnetism on a backlight unit; and attaching the magnetic adhesive member and the panel support member.

In some embodiments, the attaching of the panel support member may include attaching the panel support member to an edge of the rear surface.

In other embodiments, the attaching of the panel support member may include applying a panel adhesive member that attaches the display panel and the panel support member together.

In still other embodiments, the applying of the panel adhesive member may include applying the panel adhesive member to the rear surface of the display panel or applying the panel adhesive member to the panel support member.

In even other embodiments, the panel support member may be a conductor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1A:
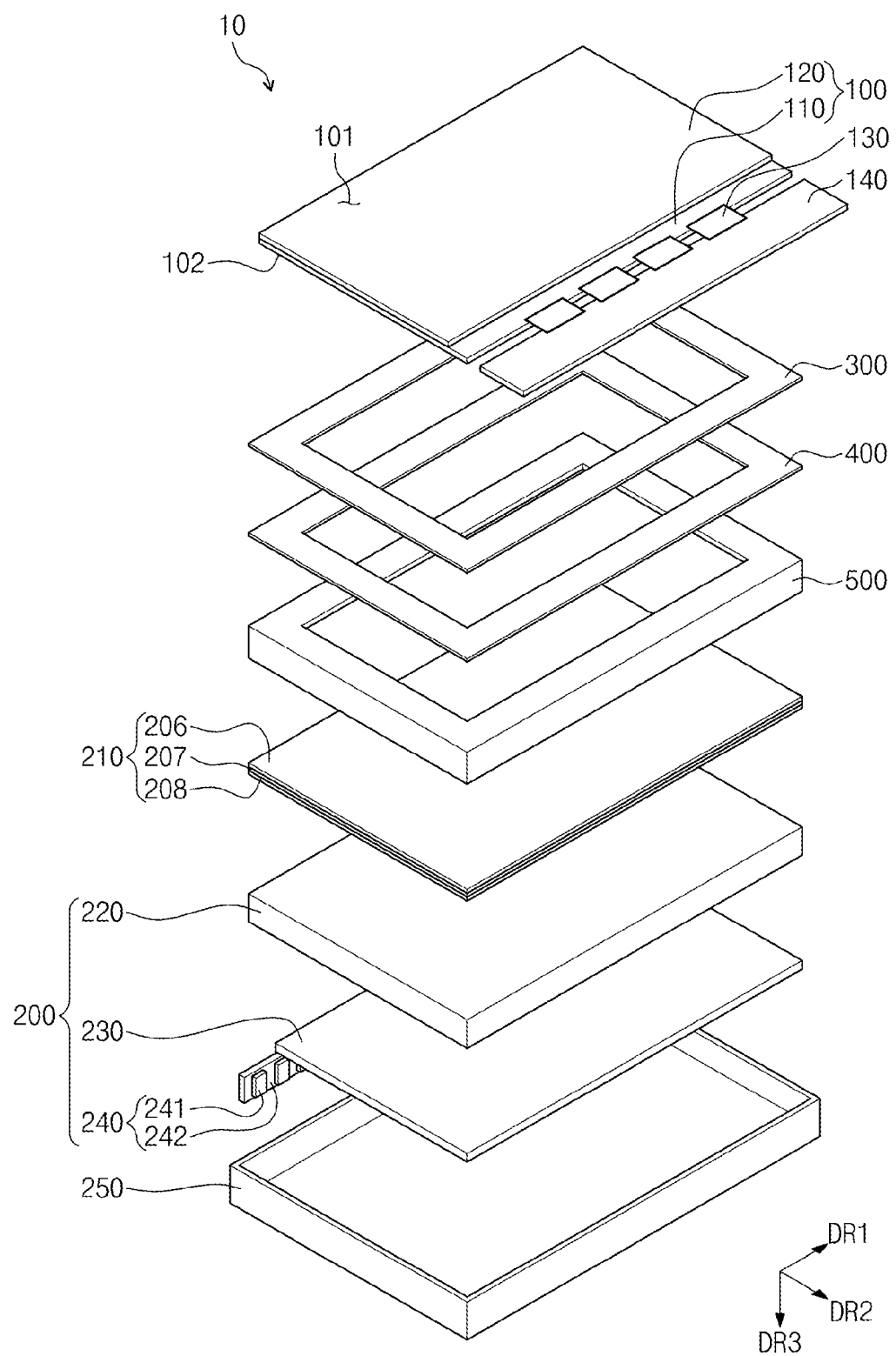
FIG. 1A is a schematic exploded perspective view illustrating a display device according to an embodiment of the inventive concept.

The objects of the inventive concept and other objects, features, and advantages will be easily understood through preferred embodiments related to the accompanying drawings. However, the inventive concept may be embodied in different forms and should not be construed as limited to the embodiments described herein. Rather, these embodiments are provided so that this disclosure will be thorough and complete, and will fully convey the scope of the inventive concept to those skilled in the art.

In describing each drawing, like reference numerals refer to like elements. In the accompanying drawings, the dimensions of elements are exaggerated for clarity of illustration. The terms 'first' and/or 'second' may be used to describe various elements but the elements should not be limited by there terms. These terms are merely used for the purpose of discriminating one element from another element. For example, a first component may be referred to as a second component and vice versa without departing from the scope of the inventive concept. The terms of a singular form may include plural forms unless they have a clearly different meaning in the context.

The meaning of "include," "comprise," "including," or "comprising," specifies a property, a region, a fixed number, a step, a process, an element and/or a component but does not exclude other properties, regions, fixed numbers, steps, processes, elements and/or components. Additionally, it will also be understood that when a layer (or film) is referred to as being 'on' another layer or substrate, it can be directly on the other layer or substrate, or intervening layers may also be present. On the contrary, it will also be understood that when a layer (or film) is referred to as being 'below' another layer or substrate, it can be directly below the other layer or substrate, or intervening layers may also be present.

FIG. 1A is a schematic exploded perspective view illustrating a display device according to an embodiment of the inventive concept.

Referring to FIG. 1A, a display device 10 includes a display panel 100, a backlight unit 200, a panel support member 300, and a magnetic adhesive member 400. The display device 10 further may include a mold frame 500 and a bottom chassis.

A major axis of the display device 10 is defined as a first direction (for example, a DR1 direction of FIG. 1A) and a minor direction of the display device 10 is defined as a second direction (for example, a DR2 direction of FIG. 1A) perpendicular to the first direction (for example, the DR1 direction of FIG. 1A). The bottom chassis 250, the backlight unit 200, the mold frame 500, and the display panel 100 are sequentially stacked in a direction that is vertical to each of the first direction (for example, the DR1 direction of FIG. 1A) and the second direction (for example, the DR2 direction of FIG. 1A).

The display panel 100 displays an image. The display panel 100, as a light-receiving type display panel, may include various display panels, for example, a liquid crystal display panel, a plasma display panel, an electrophoretic display panel, a microelectromechanical system (MEMS) display panel, and an electrowetting display panel. A case that a display panel according to an embodiment of the inventive concept is a liquid crystal display panel is described as an example.

The liquid crystal display panel may be any panel in one of Vertical Alignment (VA) mode, Patterned Vertical Alignment (PVA) mode, in-plane switching (IPS) mode, fringe-field switching (FFS) mode, and Plane to Line Switching (PLS) mode, and is not limited to a panel in a specific mode.

The display panel 100 may have a roughly rectangular shape. The display panel 100 includes a display surface 101 and a rear surface 102. The display surface 101 displays an image and is exposed to the outside. The rear surface 102 is opposed to the display surface 101. The display surface 101 and the rear surface 102 are spaced apart from each other in a third direction (for example, a DR3 direction of FIG. 1A) that is vertical to each of the first direction (for example, the DR1 direction of FIG. 1A) and the second direction (for example, the DR2 direction of FIG. 1A).

The display panel 100 may include a first substrate 110 and a second substrate 120 disposed on the first substrate 110. The display panel 100 will be described in more detail later.

The display device 10 may further include a printed circuit board 140 and a tape carrier package 130.

The printed circuit board 140 is electrically connected to the display panel 100. The printed circuit board 140 is electrically connected to the display panel 100. The printed circuit board 140 may include a driving unit (not shown). According to an embodiment of the inventive concept, although it is described that the driving unit is included in the printed circuit board 140, the driving unit may be included in the tape carrier package 130 or the first substrate 110.

The driving unit generates a driving signal for driving the display panel 100 in response to an external signal. The external signal is a signal provided from the printed circuit board 140 and may include an image signal, various control signals, and a driving voltage, for example. The driving signal may include a gate signal applied to a gate line and a data signal applied to a data line.

The driving unit may include a data driver (not shown) converting an image signal to a data signal to transmit the data signal to the display panel 100 and a gate driver (not shown) converting an image signal to a gate signal to transmit the gate signal to the display panel 100. The inventive concept is not limited thereto. Each of the data driver and the gate driver may be configured in a chip and may be included in the tape carrier package 130 or may be included on the first substrate 110 in a Chip On Glass (COG) form.

The tape carrier package 130 connects the printed circuit board 140 and the display panel 100 electrically. The tape carrier package 130 may be in plurality. The tape carrier package 130 may be bent to cover a side of the bottom chassis 250.

The backlight unit 200 may include a light source unit 240 and a light guide plate 220. The backlight unit 200 is formed below the display panel 100 and provides light to the display panel 100.

The light source unit 240 provides light to the light guide plate 220. The light source unit 240 may include at least one light source 241 and a circuit substrate 242 mounting the light source 241 on one surface thereof and applying power to the light source 241. The light source 241 may be light emitting diodes (LEDs). The circuit substrate 242 may have a plate shape. The light source 241 may be provided in plurality and the plurality of light sources may be spaced apart from each other in the first direction (for example, the DR1 direction of FIG. 1A) on the circuit substrate 242.

The light guide plate 220 guides and emits light provided from the light source unit 240. The light guide plate 220 may be provided in a rectangular plate shape and may be formed below the display panel 100. The light guide plate 220 may be formed of a transparent polymer resin such as polycarbonate or polymethyl methacrylate. The light guide plate 220 guides light provided from the light source unit 240 toward the display panel 100. Light incident to the inside of the light guide plate 220 is emitted toward the display panel 100 through the top of the light guide plate 220.

Although it is described that the light source unit 240 is equipped in correspondence to one of the side surfaces of the light guide plate 220 in the display device 10, the inventive concept is not limited thereto and a plurality of light source units 240 may be disposed along other side surfaces of the light guide plate 220. Although it is described that the display device 10 includes an edge-type light source unit 240, the inventive concept is not limited thereto and the display device 10 according to another embodiment of the inventive concept may include a direct-type light source unit 240.

The backlight unit 200 may further include a reflective sheet 230. The reflective sheet 230 may be formed below the light guide plate 220. The reflective sheet 230 changes a path of light by reflecting the light which is not progressing in the direction of the display panel 100 and the light may be leaking in other directions, so as to allow the reflected light to progress in the direction of the display panel 100. Accordingly, the reflective sheet 230 may increase the amount of light provided toward the display panel 100. Although it is shown in FIG. 1A that the thickness of the reflective sheet 230 is exaggerated for convenience of description, the thickness of the reflective sheet 230 may be similar to the thickness of a first optical sheet 208, the thickness of a second optical sheet 207, and the thickness of a third optical sheet 206.

An optical member 210 may be provided between the backlight unit 200 and the display panel 100. The optical member 210 may be disposed between the display panel 100 and the light guide plate 220. The optical member 210 improves the brightness and viewing angle of light that is emitted to a light emitting surface of the light guide plate 220. The optical member 210 may include a first optical sheet 208, a second optical sheet 207, and a third optical sheet 206, which are sequentially stacked.

The first optical sheet 208 may be a diffusion sheet for diffusing light emitted from the light guide plate 220. The second optical sheet 207 may be a prism sheet for condensing the light diffused from the diffusion sheet in a direction perpendicular to a plane of the display panel 100 at the top. The third optical sheet 206 may be a protective sheet for protecting the prism sheet from external impact. For the optical member 210, at least one of the first optical sheet 208, the second optical sheet 207, and the third optical sheet 206 may overlap in plurality as used and if necessary, any one optical sheet may be omitted.

The panel support member 300 is disposed between the display panel 100 and the backlight unit 200. As seen from a thickness direction (for example, the DR3 direction of FIG. 1A)) of the display panel 100, the panel support member 300 may have a square ring shape.

The panel support member 300 supports an edge of the display panel 100. In more detail, the panel support member 300 supports an edge of the rear surface 102 of the display panel 100.

The panel support member 300 is attached to the magnetic adhesive member 400 having magnetism. The panel support member 300 may be a conductor. For example, the panel support member 300 may include metal.

The magnetic adhesive member 400 is disposed between the panel support member 300 and the backlight unit 200 and has magnetism. As seen from a thickness direction (for example, the DR3 direction of FIG. 1A)) of the display panel 100, the magnetic adhesive member 400 may have a square ring shape.

The magnetic adhesive member 400 is disposed on the backlight unit 200. In more detail, the magnetic adhesive member 400 is disposed on an edge of the top of the backlight unit 200.

The magnetic adhesive member 400 is attached to the panel support member 300. The magnetic adhesive member 400 may have magnetism. The magnetic adhesive member 400 may be a magnet, for example. The magnetic adhesive member 400 with magnetism may be strongly attached to the panel support member 300 by magnetic force.

The panel support member 300 and the magnetic adhesive member 400 will be described in more detail later.

The mold frame 500 is disposed between the display panel 100 and the backlight unit 200. The mold frame 500 is provided along an edge of the display panel 100 to support the bottom of the display panel 100. As seen from a thickness direction (for example, the DR3 direction of FIG. 1A)) of the display panel 100, the mold frame 500 may have a square ring shape approximately.

The bottom chassis 250 may be formed below the backlight unit 200. The bottom chassis 250 may receive components of the backlight unit 200 and the mold frame 500.

Figure 1B:
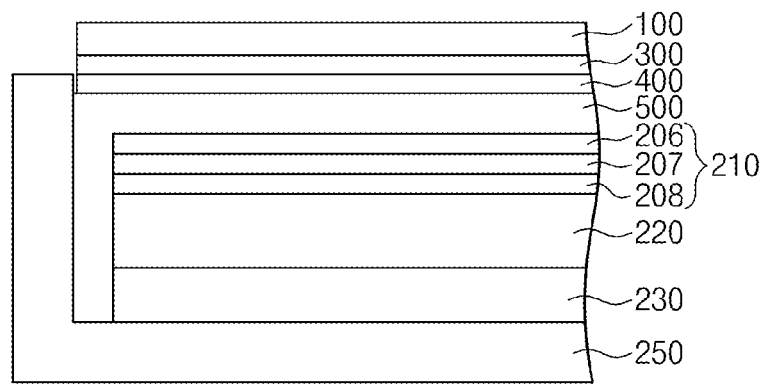
FIG. 1B is a schematic sectional view illustrating a display device according to an embodiment of the inventive concept.

FIG. 1B is a schematic sectional view illustrating a display device according to an embodiment of the inventive concept.

Referring to FIGS. 1A and 1B, the magnetic adhesive member 400 may be disposed on the mold frame 500. The magnetic adhesive member 400 may be attached to the edge of the top of the mold frame 500. Although not shown in the drawings, the magnetic adhesive member 400 may be attached to the mold frame 500 by an adhesive.

Figure 1C:
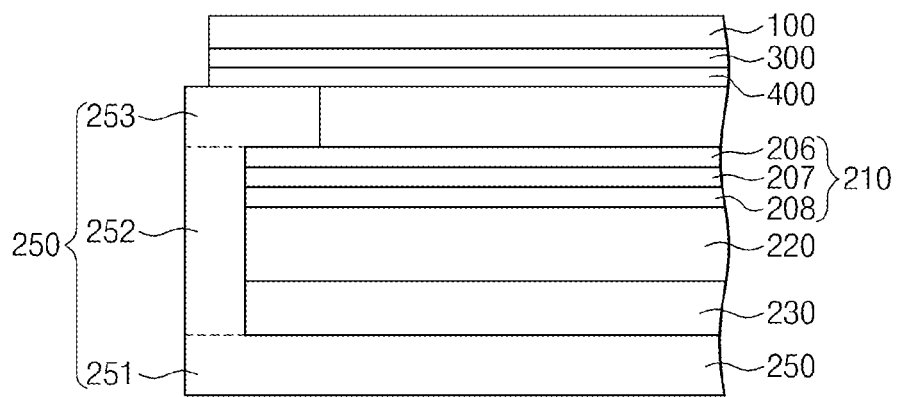
FIG. 1C is a schematic sectional view illustrating a display device according to an embodiment of the inventive concept.

FIG. 1C is a schematic sectional view illustrating a display device according to an embodiment of the inventive concept.

Referring to FIG. 1C, the bottom chassis 250 may include a bottom part 251 formed below the light guide plate 230, a bottom side part 252 connected to a side of the bottom part 251, and a bottom cover part 253 connected to the bottom side part 252 and facing the bottom part 251. The bottom cover part 253 may overlap a portion of the bottom part 251.

The magnetic adhesive member 400 may be disposed on the bottom chassis 250. The magnetic adhesive member 400 may adhere to the bottom cover part 253, and the magnetic adhesive member 400 may be spaced apart from the third optical sheet 206 by an air gap. Although not shown in the drawings, the magnetic adhesive member 400 may be attached to the bottom cover part 253 by an adhesive. The magnetic adhesive member 400 may have a form selected from tape, sheet, plate, coated thin film, paste, and agglomerated particles; the magnetic adhesive member 400 may be a magnetic material having magnetism including one selected from metals, metal alloys, ceramics such as ferrites, and polymers such as polyaniline-based organic magnets. The panel support member 300 may have a thickness less than that that for shielding magnetic field, because of a loop shape of the magnetic adhesive member (400) shown in, for example, FIG. 6A and the magnetic flux lines could be mostly bounded within the loop-shaped magnetic adhesive member (400) without the need to increase the thickness of the panel support member (300) to shield the magnetic field generated by the magnetic adhesive member (400), and, in addition to the removal of top chassis, a thin display device can be realized. Although it is described that the magnetic adhesive member 400 is attached to the mold frame 500 or the bottom chassis 250 in the display device 10, the inventive concept is not limited thereto and the position is not limited specifically as long as the display panel 100 is fixed and the display surface 101 is exposed to the outside.

Figure 2:
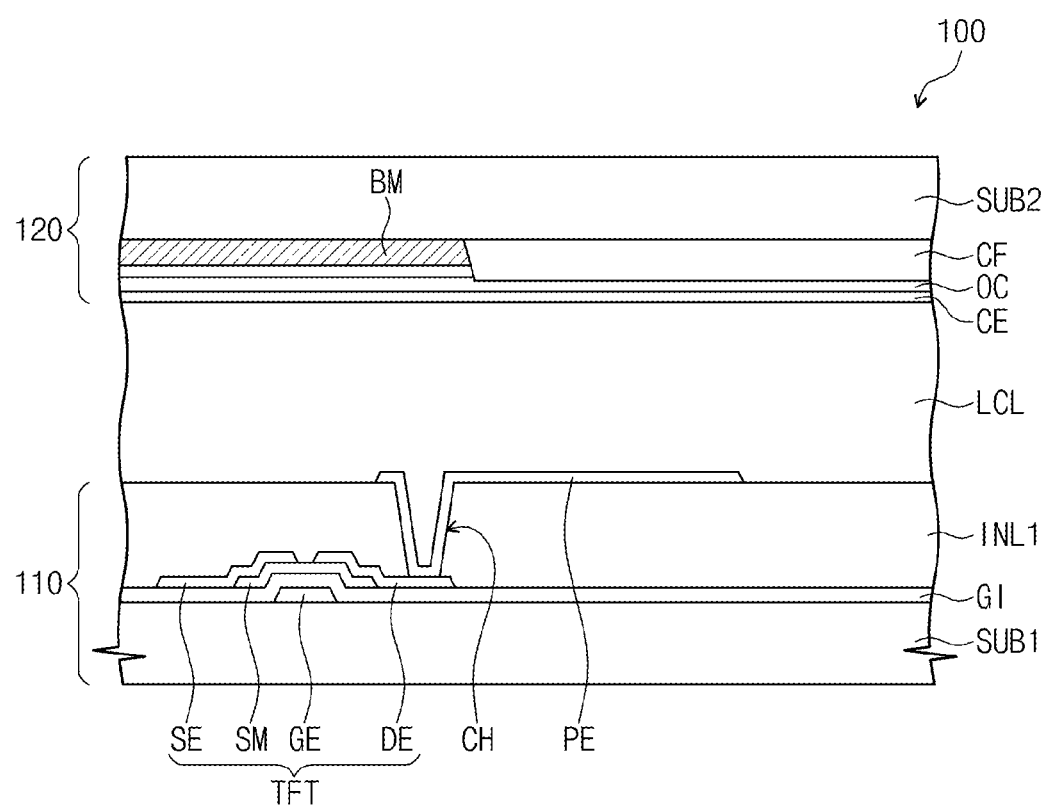
FIG. 2 is a schematic sectional view illustrating a display panel included in a display device according to an embodiment of the inventive concept.

FIG. 2 is a schematic sectional view illustrating a display panel 100 included in a display device according to an embodiment of the inventive concept.

Referring to FIG. 2, the display panel 100 includes a first substrate 110, a second substrate 120, and a liquid crystal layer (LCL). The first substrate 110 includes a first base substrate SUB1, a thin film transistor TFT, and a pixel electrode PE.

The first base substrate SUB1, as a transparent insulating substrate, may be formed of silicon, glass, or plastic.

A gate line (not shown) and a data line (not shown) may be disposed on the first base substrate SUB1. The gate line may be in plurality and they may be formed extending in the first direction (for example, the DR1 direction of FIG. 1A) on the first base substrate SUB1. The data line may be in plurality and the plurality of data lines may be formed extending in the second direction (for example, the DR2 direction of FIG. 1A) intersecting the first direction (for example, the DR1 direction of FIG. 1A) with the gate line and the gate insulating layer GI therebetween.

The thin film transistor TFT includes a gate electrode GE, a semiconductor pattern SM, a source electrode SE, and a drain electrode DE.

The gate electrode GE is disposed on the first base substrate SUB1. The gate electrode GE may be branched from the gate line and formed.

The gate electrode GE may be formed of metal. The gate electrode GE may be formed of nickel, chrome, molybdenum, aluminum, titanium, copper, tungsten, or an alloy thereof. The gate electrode GE may be formed in a single or multi-layer using metal. For example, the gate electrode GE may be a triple layer where a molybdenum layer, an aluminum layer, and a molybdenum layer are sequentially stacked or a double layer where a titanium layer and a copper layer are sequentially stacked. Or, the gate electrode GE may be a single layer formed of an alloy of titanium and copper.

The gate insulating layer GI is disposed on the gate electrode GE. The gate insulating layer GI covers the gate electrode GE. The gate insulating layer GI may be formed of an organic or inorganic insulating material.

The semiconductor pattern SM is provided on the gate insulating layer GI. The semiconductor pattern SM faces the gate electrode GE with the gate insulating layer GI in-between. A partial area of the semiconductor pattern SM overlaps the gate electrode GE.

The source electrode SE may be branched from the data line and formed. At least a part of the source electrode SE may be disposed on the semiconductor pattern SM. At least a part of the source electrode SE may overlap each of the semiconductor pattern SM and the gate electrode GE.

The drain electrode DE is provided spaced apart from the source electrode SE with the semiconductor pattern SM therebetween. At least a part of the drain electrode DE may be disposed on the semiconductor pattern SM. At least a part of the drain electrode DE may overlap each of the semiconductor pattern SM and the gate electrode GE.

Each of the source electrode SE and the drain electrode DE may be formed of nickel, chrome, molybdenum, aluminum, titanium, copper, tungsten, or an alloy thereof. Each of the source electrode SE and the drain electrode DE may be formed in a single or multi-layer using metal. For example, each of the source electrode SE and the drain electrode DE may be a double layer where titanium and copper are stacked sequentially. Or, each of the source electrode SE and the drain electrode DE may be a single layer formed of an alloy of titanium and copper.

The first substrate 110 may further include a first insulating layer INL1 on the semiconductor pattern SM, the source electrode SE, and the drain electrode DE. The first insulating layer INL1 may be formed of an insulating material, for example, silicon oxide or silicon nitride.

The first insulating layer INL1 includes a contact hole CH. The contact hole CH exposes at least a portion of the drain electrode DE.

A pixel electrode PE is disposed on the first insulating layer INL1. The pixel electrode PE may be connected to the drain electrode DE through the contact hole CH, with the first insulating layer INL1 therebetween.

The pixel electrode PE may be formed of transparent conductive material. The pixel electrode PE may be formed of transparent conductive oxide. The transparent conductive oxide, for example, may be indium tin oxide (ITO), indium zinc oxide (IZO), and indium tin zinc oxide (ITZO). The pixel electrode PE may be formed through various methods and for example, may be formed through a photolithograph process.

The second substrate 120 includes a second base substrate SUB2, a color filter CF, a black matrix BM, and a common electrode CE. However, the inventive concept is not limited thereto and the first substrate 110 may include the color filter CF, the black matrix BM, and the common electrode CE.

The second base substrate SUB2, as a transparent insulating substrate, may be formed of silicon, glass, or plastic.

The color filter CF is disposed on the second base substrate SUB2 and provides color to light provided from the backlight unit 200. The color filter CF may include a red color filter, a green color filter, and a blue color filter. The color filter CF may further include a white color filter.

The color filter CF may be obtained by forming a color layer representing red, green, blue, or other colors on the second base substrate SUB2 and patterning the color layer through photolithography. A method of forming the color filter CF is not limited thereto and the color filter CF may be formed through an inkjet method.

The black matrix BM is disposed on the second base substrate SUB2 and is formed overlapping a light blocking region of the first substrate 110. The light blocking region may be defined by an area where the data line, the gate line, and thin film transistor TFT are formed. Since the pixel electrode PE is not typically formed in the light blocking region, liquid crystal molecules are not aligned. This may cause light leakage. The black matrix BM is formed in the light blocking region to prevent light leakage. The black matrix BM may be obtained by forming a light blocking layer absorbing light and patterning the light blocking layer through photolithography. Through The black matrix BM may be formed through another method, for example, an inkjet method.

A planarization layer OC may be disposed on the color filter CF and the black matrix BM. The planarization layer OC may planarize the top of the second base substrate SUB2 on which the black matrix BM is disposed. The planarization layer OC may be formed of, for example, an organic or inorganic insulating layer.

The common electrode CE may be disposed on the planarization layer OC. The common electrode CE may receive a common voltage. The common electrode CE may face the pixel electrode PE and also may form an electric field together with the pixel electrode PE so as to drive the liquid crystal layer LCL.

The common electrode CE may be formed of a transparent conductive material. The common electrode CE may be formed of, for example, conductive metal oxide such as indium tin oxide (ITO), indium zinc oxide (IZO), and indium tin zinc oxide (ITZO). The common electrode CE may be formed through various methods, for example, a photolithograph process.

The liquid crystal layer LCL includes a plurality of liquid crystal molecules having dielectric anisotropy. The liquid crystal molecules of the liquid crystal layer LCL rotate in a specific direction between the first substrate 110 and the second substrate 120 when an electric field is applied between the pixel electrode PE and the common electrode CE, thereby adjusting the transmittance of light incident into the liquid crystal layer LCL.

Figure 3A:
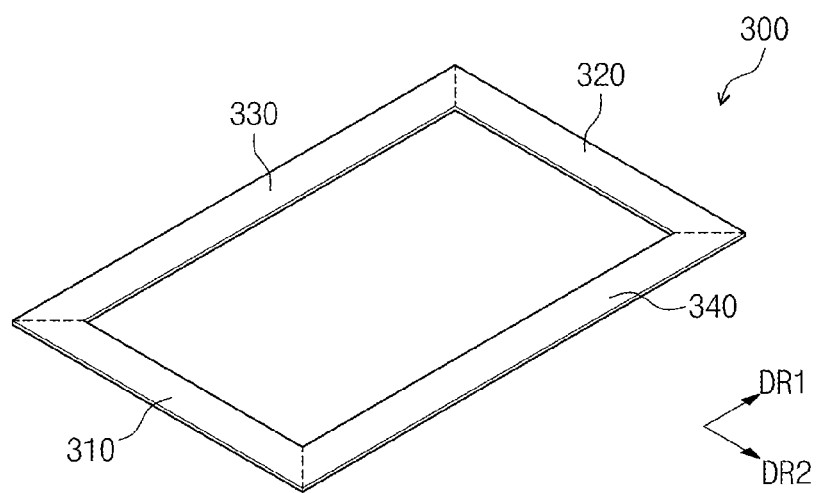
FIG. 3A is a schematic sectional view illustrating a panel support member included in a display device according to an embodiment of the inventive concept.

FIG. 3A is a schematic sectional view illustrating a panel support member 300 included in a display device according to an embodiment of the inventive concept.

Figure 3B:
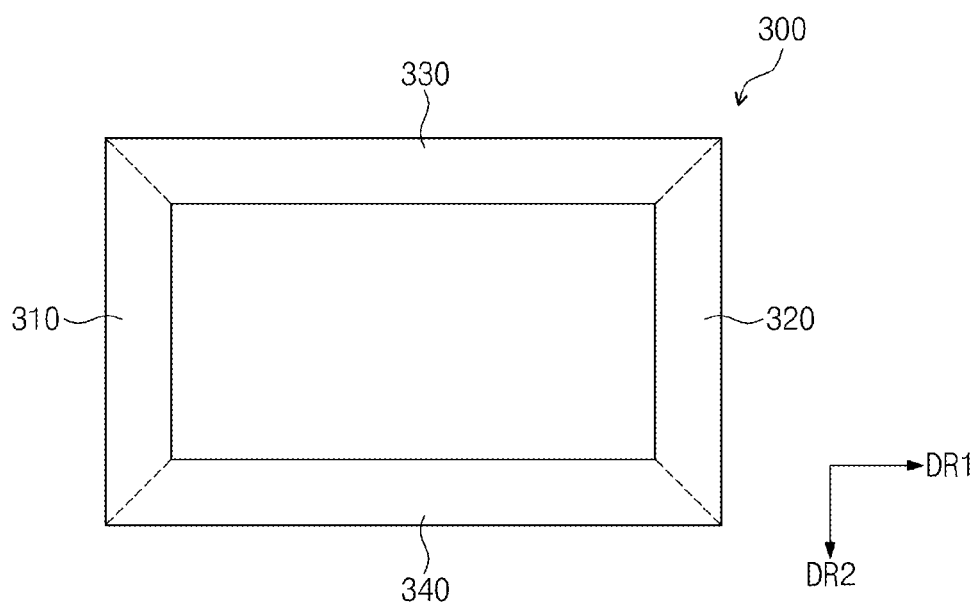
FIG. 3B is a schematic plan view illustrating a panel support member included in a display device according to an embodiment of the inventive concept.

FIG. 3B is a schematic plan view (i.e. as seen from a thickness direction) illustrating a panel support member 300 included in a display device according to an embodiment of the inventive concept.

Referring to FIGS. 3A and 3B, the panel support member 300 includes a first panel support member 310, a second panel support member 320, a third panel support member 330, and a fourth panel support member 340. The second panel support member 320 is spaced apart from the first panel support member 310 in a first direction (for example, a DR1 direction of FIGS. 3A and 3B). The third panel support member 330 is connected to the first panel support member 310 and the second panel support member 320. The fourth panel support member 340 is spaced apart from the third panel support member 330 in a second direction (for example, a DR2 direction of FIGS. 3A and 3B).

Figure 4A:
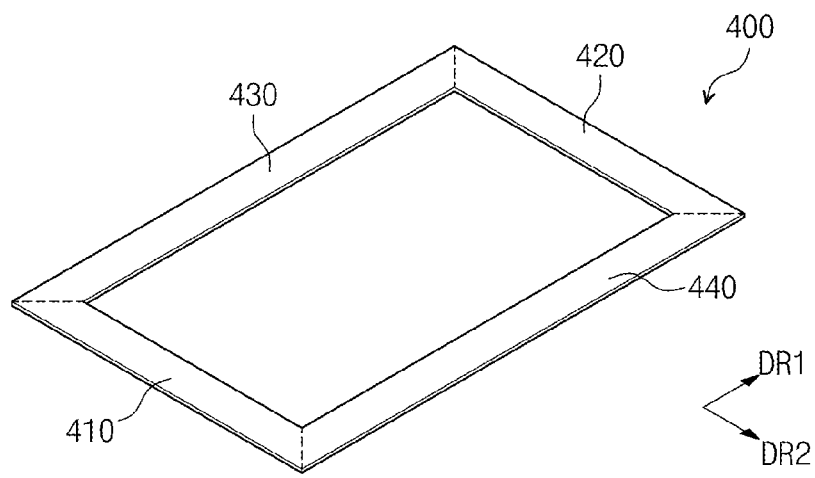
FIG. 4A is a schematic sectional view illustrating a magnetic adhesive member included in a display device according to an embodiment of the inventive concept.

FIG. 4A is a schematic sectional view illustrating a magnetic adhesive member 400 included in a display device according to an embodiment of the inventive concept.

Figure 4B:
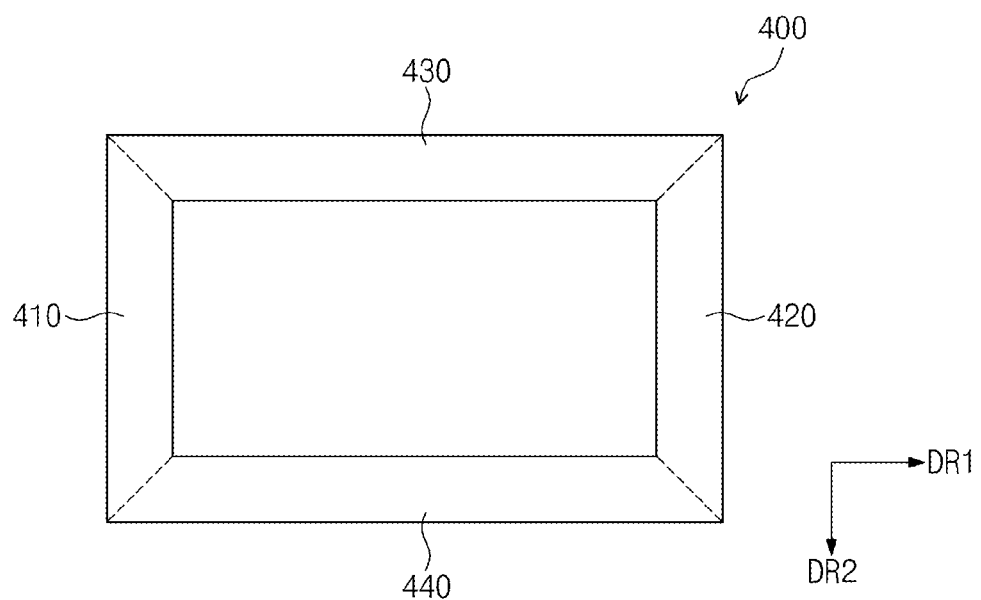
FIG. 4B is a schematic plan view illustrating a magnetic adhesive member included in a display device according to an embodiment of the inventive concept.

FIG. 4B is a schematic plan view (i.e. as seen from a thickness direction) illustrating a magnetic adhesive member 400 included in a display device according to an embodiment of the inventive concept.

Referring to FIGS. 4A and 4B, the magnetic adhesive member 400 includes a first magnetic adhesive member 410, a second magnetic adhesive member 420, a third magnetic adhesive member 430, and a fourth magnetic adhesive member 440. The second magnetic adhesive member 420 is spaced apart from the first magnetic adhesive member 410 in a first direction (for example, a DR1 direction of FIGS. 4A and 4B). The third magnetic adhesive member 430 is connected to the first magnetic adhesive member 410 and the second magnetic adhesive member 420. The fourth magnetic adhesive member 440 is spaced apart from the third magnetic adhesive member 430 in a second direction (for example, a DR2 direction of FIGS. 4A and 4B).

Figure 5A:
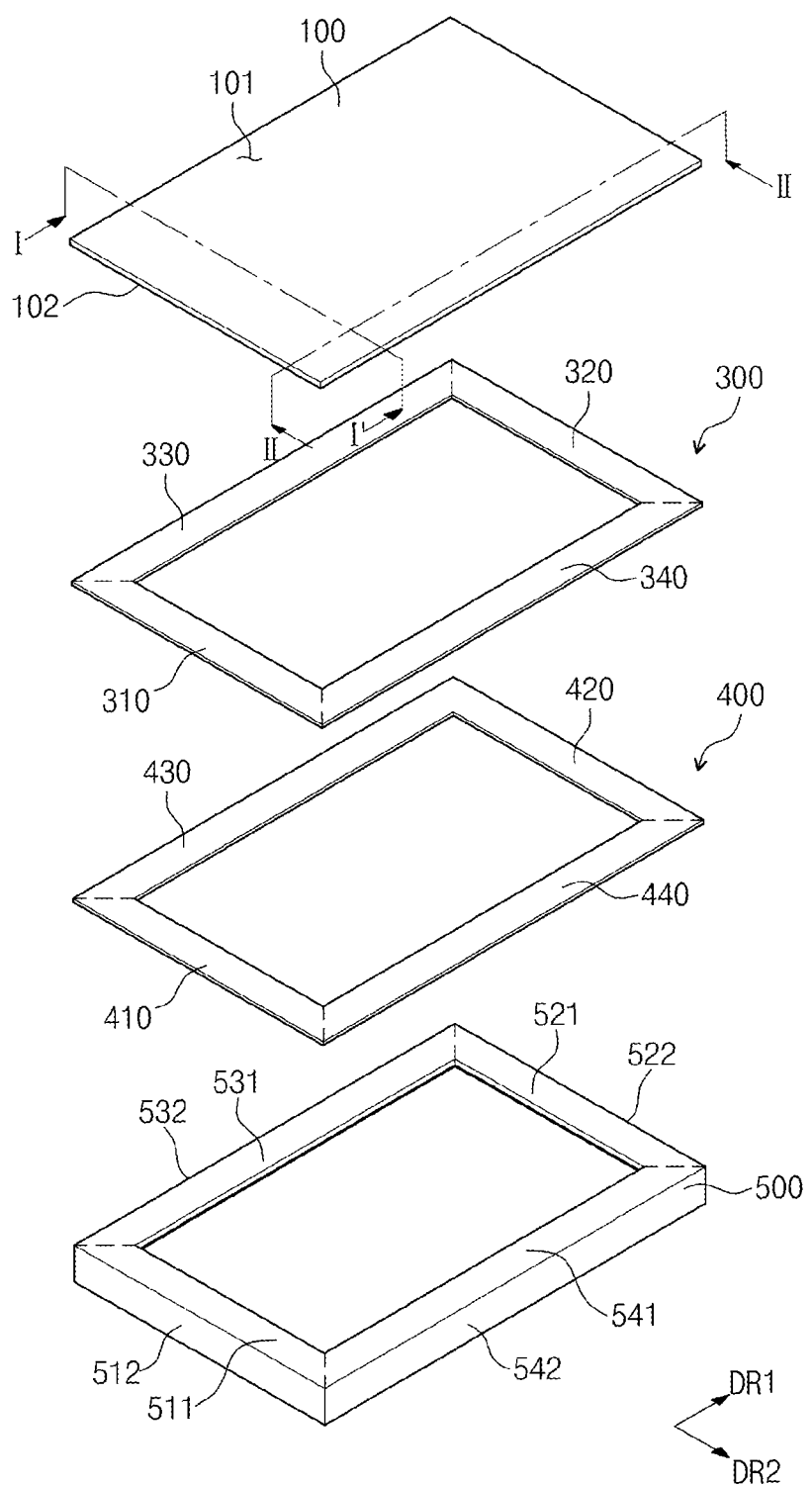
FIG. 5A is a schematic exploded perspective view illustrating a portion of a display device according to an embodiment of the inventive concept.

FIG. 5A is a schematic exploded perspective view illustrating a portion of a display device according to an embodiment of the inventive concept.

Figure 5B:
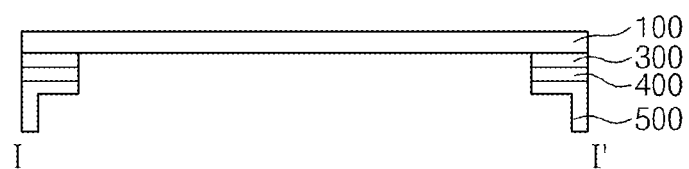
FIG. 5B is a schematic sectional view taken along a line I-I' of FIG. 5A.

FIG. 5B is a schematic sectional view taken along a line I-I' of FIG. 5A.

Figure 5C:
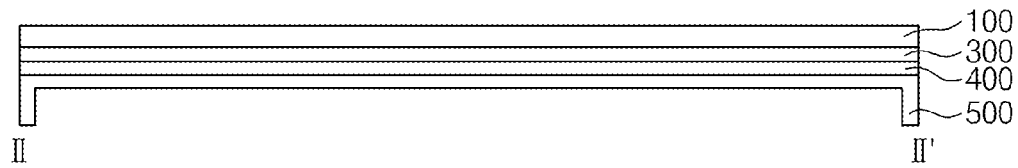
FIG. 5C is a schematic sectional view taken along a line II-II' of FIG. 5A.

FIG. 5C is a schematic sectional view taken along a line II-II' of FIG. 5A.

Referring to FIGS. 5A to 5C, a mold frame 500 includes mold top parts 511, 521, 531, and 541 and mold side parts 512, 522, 532, and 542 connected to the side surfaces of the mold top parts 511, 521, 531, and 541.

The mold top parts 511, 521, 531, and 541 include a first mold top part 511, a second mold top part 521, a third mold top part 531, and a fourth mold top part 541. The second mold top part 521 is spaced apart from the first mold top part 410 in a first direction (for example, a DR1 direction of FIG. 5A). The third mold top part 531 is connected to the first mold top part 511 and the second mold top part 521. The fourth mold top part 541 is spaced apart from the third mold top part 531 in a second direction (for example, a DR2 direction of FIG. 5A).

The mold side parts 512, 522, 532, and 542 include a first mold side part 512, a second mold side part 522, a third mold side part 532, and a fourth mold side part 542. The first mold side part 512 is connected to the first mold top part 511. The second mold side part 522 is connected to the second mold top part 521. The third mold side part 532 is connected to the third mold top part 531. The fourth mold side part 542 is connected to the fourth mold top part 541.

The magnetic adhesive member 400 includes a first magnetic adhesive member 410, a second magnetic adhesive member 420, a third magnetic adhesive member 430, and a fourth magnetic adhesive member 440. The first magnetic adhesive member 410 is attached to the first mold top part 511. The second magnetic adhesive member 420 is attached to the second mold top part 521. The third magnetic adhesive member 430 is attached to the third mold top part 531. The fourth magnetic adhesive member 440 is attached to the fourth mold top part 541.

The panel support member 300 is attached to a lower part of the display panel 100. The panel support member 300 is attached to a rear surface 102 opposed to a display surface 101. The panel support member 300 includes a first panel support member 310, a second panel support member 320, a third panel support member 330, and a fourth panel support member 340.

The first panel support member 310 is attached to the first magnetic adhesive member 410. The second panel support member 320 is attached to the second magnetic adhesive member 420. The third panel support member 330 is attached to the third magnetic adhesive member 430. The fourth panel support member 340 is attached to the fourth magnetic adhesive member 440.

Although it is shown in FIGS. 5A and 5B that the width of the first panel support member 310, the width of the first magnetic adhesive member 410, and the width of the first mold top part 511 are identical, the inventive concept is not limited thereto and thus, at least one of the widths may be different from the others. Furthermore, at least one of the width of the second panel support member 320, the width of the second magnetic adhesive member 420, and the width of the second mold top part 521 may be different from the others. At least one of the width of the third panel support member 330, the width of the third magnetic adhesive member 430, and the width of the third mold top part 531 may be different from the others. At least one of the width of the fourth panel support member 340, the width of the fourth magnetic adhesive member 440, and the width of the fourth mold top part 541 may be different from the others.

Although it is described with reference to FIGS. 5A to 5C that the magnetic adhesive member 400 is attached to the mold frame 500, the inventive concept is not limited thereto as the magnetic adhesive member 400 may be attached to the bottom chassis 250 and also may instead be attached to various positions as long as the display panel 100 is fixed and the display surface 101 is exposed to the outside.

Figure 6A:
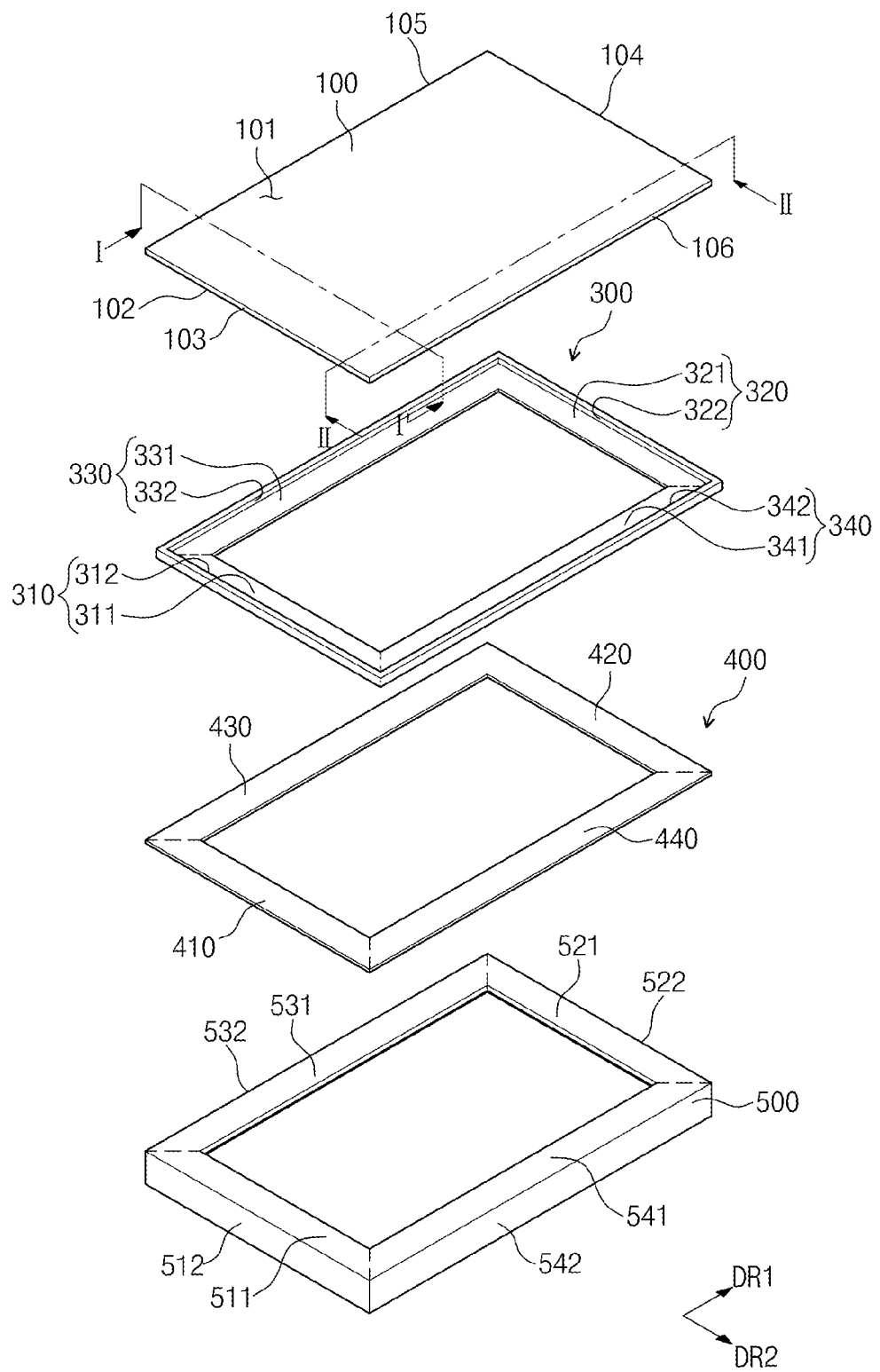
FIG. 6A is a schematic exploded perspective view illustrating a portion of a display device according to an embodiment of the inventive concept.

FIG. 6A is a schematic exploded perspective view illustrating a portion of a display device according to another embodiment of the inventive concept.

Figure 6B:
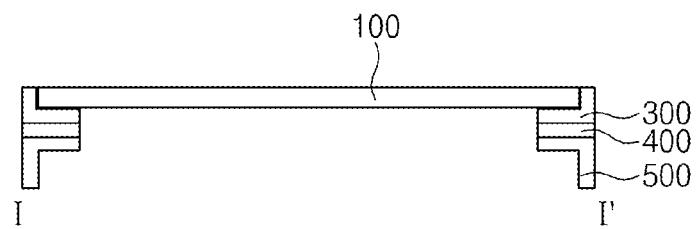
FIG. 6B is a schematic sectional view taken along a line I-I' of FIG. 6A.

FIG. 6B is a schematic sectional view taken along a line I-I' of FIG. 6A.

Figure 6C:
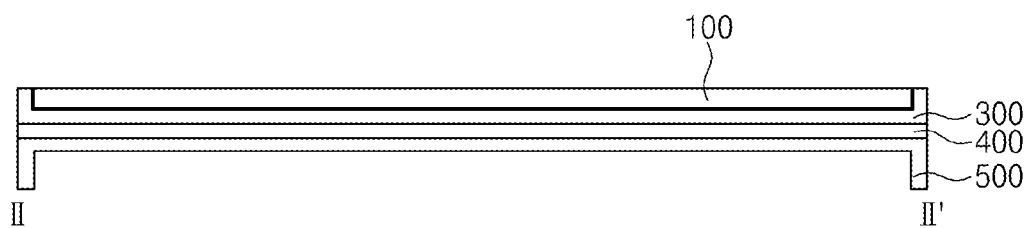
FIG. 6C is a schematic sectional view taken along a line II-II' of FIG. 6A.

FIG. 6C is a schematic sectional view taken along a line II-II' of FIG. 6A.

Referring to FIGS. 6A to 6C, a display panel 100 may have a rectangular shape. The display panel 100 includes a display surface 101 and a rear surface 102 opposed to the display surface 101. The display panel 100 includes panel side surfaces 103, 104, 105, and 106 connecting the display surface 101 and the rear surface 102. The panel side surfaces 103, 104, 105, and 106 include a first panel side 103, a second panel side 104, a third panel side surface 105, and a fourth panel side surface 106. The second panel side 104 is spaced apart from the first panel side 103 in a first direction (for example, a DR1 direction). The third panel side 105 is connected to the first panel side 103 and the second panel side 104. The fourth panel side 106 is spaced apart from the third panel side 105 in a second direction (for example, a DR2 direction).

A mold frame 500 includes mold top parts 511, 521, 531, and 541 and mold side parts 512, 522, 532, and 542 connected to the side surfaces of the mold top parts 511, 521, 531, and 541. The mold top parts 511, 521, 531, and 541 include a first mold top part 511, a second mold top part 521, a third mold top part 531, and a fourth mold top part 541. The second mold top part 521 is spaced apart from the first mold top part 410 in a first direction (for example, a DR1 direction). The third mold top part 531 is connected to the first mold top part 511 and the second mold top part 521. The fourth mold top part 541 is spaced apart from the third mold top part 531 in a second direction (for example, a DR2 direction).

The mold side parts 512, 522, 532, and 542 include a first mold side part 512, a second mold side part 522, a third mold side part 532, and a fourth mold side part 542. The first mold side part 512 is connected to the first mold top part 511. The second mold side part 522 is connected to the second mold top part 521. The third mold side part 532 is connected to the third mold top part 531. The fourth mold side part 542 is connected to the fourth mold top part 541.

The magnetic adhesive member 400 includes a first magnetic adhesive member 410, a second magnetic adhesive member 420, a third magnetic adhesive member 430, and a fourth magnetic adhesive member 440. The first magnetic adhesive member 410 is attached to the first mold top part 511. The second magnetic adhesive member 420 is attached to the second mold top part 521. The third magnetic adhesive member 430 is attached to the third mold top part 531. The fourth magnetic adhesive member 440 is attached to the fourth mold top part 541.

The panel support member 300 is attached to a lower part of the display panel 100. The panel support member 300 adheres to a rear surface 102 opposed to a display surface 101.

The panel support member 300 may include a panel support bottom part and a panel support side part. The panel support bottom part is disposed on a lower part of the display panel 100. The panel support side part is connected to the panel support bottom part vertically and covers a side of the display panel 100.

The panel support member 300 includes a first panel support member 310, a second panel support member 320, a third panel support member 330, and a fourth panel support member 340. The panel support bottom parts 311, 321, 331, and 341 include a first panel support bottom part 311, a second panel support bottom part 321, a third panel support bottom part 331, and a fourth panel support bottom part 341. The panel support side parts 312, 322, 332, and 342 include a first panel support side part 312, a second panel support side part 322, a third panel support side part 332, and a fourth panel support side part 342.

The first panel support member 310 includes a first panel support bottom part 311 and a first panel support side part 312. The first panel support side part 312 is connected to the first panel support bottom part 311 vertically. The second panel support member 320 includes a second panel support bottom part 321 and a second panel support side part 322. The second panel support side part 322 is connected to the second panel support bottom part 321 vertically. The third panel support member 330 includes a third panel support bottom part 331 and a third panel support side part 332. The third panel support side part 332 is connected to the third panel support bottom part 331 vertically. The fourth panel support member 340 includes a fourth panel support bottom part 341 and a fourth panel support side part 342. The fourth panel support side part 342 is connected to the fourth panel support bottom part 341 vertically.

The first panel support bottom part 311 is attached to a first magnetic adhesive member 410. The second panel support bottom part 321 is attached to a second magnetic adhesive member 420. The third panel support bottom part 331 is attached to a third magnetic adhesive member 430. The fourth panel support bottom part 341 is attached to a fourth magnetic adhesive member 440.

The first panel support side part 312 is attached to the first panel side 103. The first panel support side part 312 covers the first panel side 103. The second panel support side part 322 is attached to the second panel side 104. The second panel support side part 322 covers the second panel side 104. The third panel support side part 332 is attached to the third panel side 105. The third panel support side part 332 covers the third panel side 105. The fourth panel support side part 342 is attached to the fourth panel side 106. The fourth panel support side part 342 covers the fourth panel side 106.

Although it is shown in FIGS. 6A and 6B that the width of the first panel support bottom part 311, the width of the first magnetic adhesive member 410, and the width of the first mold top part 511 are identical, the inventive concept is not limited thereto and thus, at least one of the widths may be different from the others. Additionally, at least one of the width of the second panel support bottom part 321, the width of the second magnetic adhesive member 420, and the width of the second mold top part 521 may be different from the others. At least one of the width of the third panel support bottom part 331, the width of the third magnetic adhesive member 430, and the width of the third mold top part 531 may be different from the others. At least one of the width of the fourth panel support bottom part 341, the width of the fourth magnetic adhesive member 440, and the width of the fourth mold top part 541 may be different from the others.

Although it is described with reference to FIGS. 6A to 6C that the magnetic adhesive member 400 is attached to the mold frame 500, the inventive concept is not limited thereto as the magnetic adhesive member 400 may instead be attached to the bottom chassis 250 and also may be attached to various positions as long as the display panel 100 is fixed and the display surface 101 is exposed to the outside.

Figure 7:
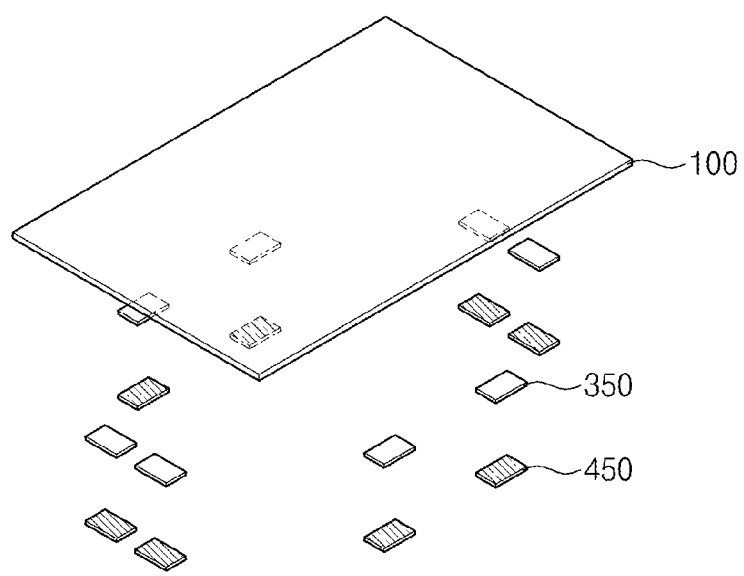
FIG. 7 is a schematic exploded perspective view illustrating a portion of a display device according to an embodiment of the inventive concept.

FIG. 7 is a schematic exploded perspective view illustrating a portion of a display device according to an embodiment of the inventive concept.

Referring to FIG. 7, the panel support member 300 of FIG. 1A may include a plurality of sub panel support members 350 spaced apart from each other. The sub panel support members 350 are disposed between the display panel 100 and the backlight unit 200 of FIG. 1A. The sub panel support members 350 may be attached to a lower part of the display panel 100. The sub panel support members 350 may be attached to sub magnetic adhesive members 450, respectively.

The magnetic adhesive member 400 of FIG. 1A may include a plurality of sub magnetic adhesive members 450 spaced apart from each other. Each of the sub magnetic adhesive members 450 may be disposed on the mold frame 500 of FIG. 1A or may be disposed on a bottom chassis 250.

Figure 8:
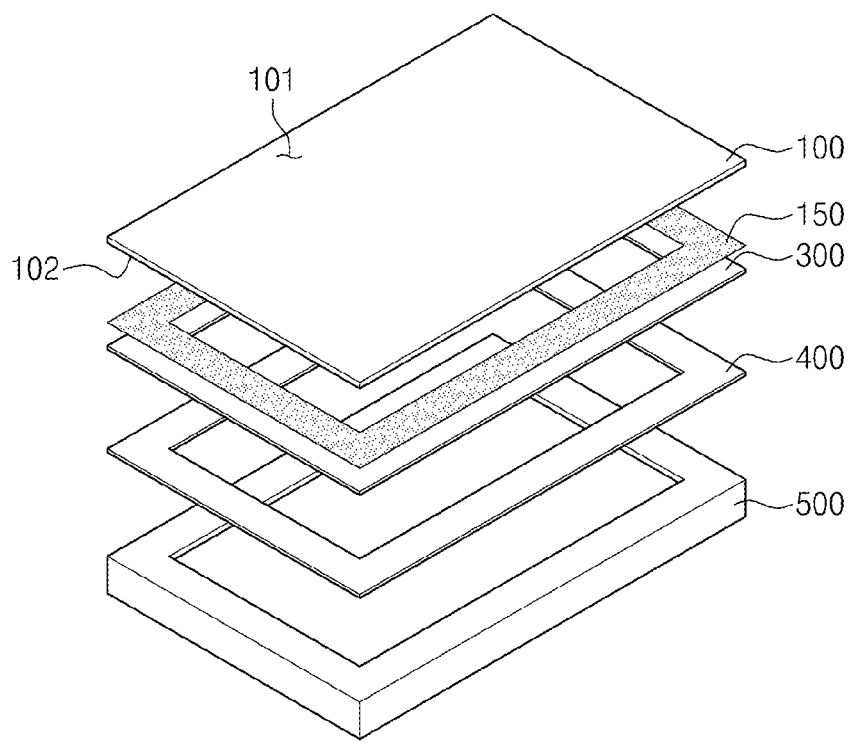
FIG. 8 is a schematic exploded perspective view illustrating a portion of a display device according to an embodiment of the inventive concept.

FIG. 8 is a schematic exploded perspective view illustrating a portion of a display device according to an embodiment of the inventive concept.

Referring to FIG. 8, a display device according to an embodiment of the inventive concept further includes a panel adhesive member 150. The panel adhesive member 150 allows the display panel 100 and the panel support member 300 to adhere to each other.

The panel adhesive member 150 is formed at a lower part of the display panel 100. The panel adhesive member 150 may be formed at an edge of the rear surface 102 opposed to the display surface 101 of the display panel 100.

The panel support member 300 adheres to the panel adhesive member 150. The panel support member 300 may also adhere to the magnetic adhesive member 400 disposed on the mold frame 500.

Since a display device according to an embodiment of the inventive concept does not include a top chassis coupled to a bottom chassis, there is no component covering a display surface of a display panel. Therefore, an image may be displayed in a broader area. Additionally, since a top chassis disposed on a display panel and overlapping a portion of a display surface is not included, it is possible to implement a slim display device and reduce the frame width of a display device.

Furthermore, a display device according to an embodiment of the inventive concept may allow a panel support member supporting a display panel and a magnetic adhesive member disposed on a backlight unit to strongly adhere to each other by magnetism and accordingly, even when a top chassis is not included, it is possible to prevent the movement of a display panel due to external force.

Additionally, in relation to a display device according to an embodiment of the inventive concept, even when a panel support member overlaps only a partial area of the rear surface of a display panel and a magnetic adhesive member overlaps only a partial area on a backlight unit, the panel support member and the magnetic adhesive member adheres to each other by magnetism. Therefore, it is possible to prevent the movement of a display panel due to external force.

Hereinafter, a method of fabricating a display device according to an embodiment of the inventive concept will be described. Hereinafter, only points different from the above-mentioned display device according to an embodiment of the inventive concept will be mainly described in detail and undescribed parts will be appreciated referring to the above-mentioned display device according to an embodiment of the inventive concept.

Figure 9:
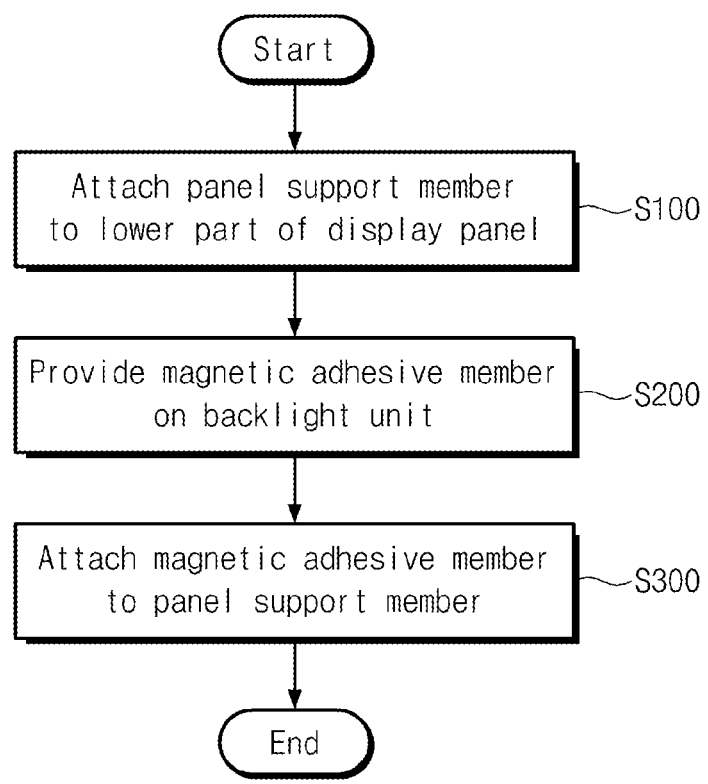
FIG. 9 is a schematic flowchart illustrating a method of fabricating a display device according to an embodiment of the inventive concept.

FIG. 9 is a schematic flowchart illustrating a method of fabricating a display device according to an embodiment of the inventive concept.

Referring to FIGS. 1A, 1B, and 9, a method of fabricating the display device 10 according to an embodiment of the inventive concept includes attaching the panel support member 300 supporting an edge of the display panel 100 to a lower part of the display panel 100 including the display surface 101 displaying an image and exposed to the outside and the rear surface 102 opposed to the display surface 101 in operation S100, providing the magnetic adhesive member 400 having magnetism on the backlight unit 200 in operation S200, and attaching the magnetic adhesive member 400 and the panel support member 300 in operation S300.

The attaching of the panel support member 300 in operation S100 may include attaching the panel support member 300 to an edge of the rear surface 102. As seen from a thickness direction of the display panel 100, the panel support member 300 may have a square ring shape. The panel support member 300 is attached to the rear surface 102 of the display panel 100 to support the display panel 100.

The attaching of the panel support member 300 in operation S100 may include applying the panel adhesive member 150 to allow the display panel 100 and the panel support member 300 to adhere to each other. The applying of the panel adhesive member 150 may include applying the panel adhesive member 150 to the rear surface of the display panel 100 or to the front surface of the panel support member 300. The panel support member 300 is attached to the magnetic adhesive member 400 having magnetism. The panel support member 300 may be a conductor. For example, the panel support member 300 may include metal.

The providing of the magnetic adhesive member 400 having magnetism on the backlight unit 200 in operation S200 may include providing the magnetic adhesive member 400 to the mold frame 500. For example, the magnetic adhesive member 400 may be attached to the mold frame 500. However, the inventive concept is not limited thereto as the magnetic adhesive member 400 may instead be provided to the bottom chassis 250. For example, the magnetic adhesive member 400 may be attached to the bottom chassis 250.

During the attaching of the magnetic adhesive member 400 and the panel support member 300 in operation S300, the magnetic adhesive member 400 is attached to the panel support member 300. The magnetic adhesive member 400 may have magnetism. The magnetic adhesive member 400 may be a magnet, for example. The magnetic adhesive member 400 with magnetism may be strongly attached to the panel support member 300 by magnetic force.

Since a display device fabricated through the above fabrication method according to an embodiment of the inventive concept does not include a top chassis coupled to a bottom chassis, there is no component covering a display surface of a display panel. Therefore, an image may be displayed in a broader area. Additionally, since a top chassis disposed on a display panel and overlapping a portion of a display surface is not included, it is possible to implement a slim display device and reduce the frame width of a display device.

Furthermore, a display device fabricated through the above fabrication method according to an embodiment of the inventive concept may allow a panel support member supporting a display panel and a magnetic adhesive member disposed on a backlight unit to strongly adhere to each other by magnetism and accordingly, even when a top chassis is not included, it is possible to prevent the movement of a display panel due to external force.

Additionally, in relation to a display device fabricated through the above fabrication method according to an embodiment of the inventive concept, even when a panel support member overlaps only a partial area of the rear surface of a display panel and a magnetic adhesive member overlaps only a partial area on a backlight unit, the panel support member and the magnetic adhesive member adhere to each other by magnetism. Therefore, it is possible to prevent the movement of a display panel due to external force.

According to the inventive concept, since a top chassis is not included, a display device having a thin thickness and a narrow frame width may be provided.

According to the inventive concept, since a top chassis is not included, a method of fabricating a display device having a thin thickness and a narrow frame width may be provided.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display device, comprising:
   a display panel including a display surface that displays an image and is exposed to the outside and a rear surface that is opposed to the display surface;
   a backlight unit formed at a lower part of the display panel and providing light to the display panel;
   a panel support member disposed between the display panel and the backlight unit and supporting an edge of the display panel; and
   a magnetic adhesive member disposed between the panel support member and the backlight unit and having magnetism, wherein the magnetic adhesive member is a magnet, wherein each of the panel support member and the magnetic adhesive member have a front major surface opposite a back major surface, wherein the front major surface of the magnetic adhesive member mates with the back major surface of the panel support member, wherein each of the panel support member and the magnetic adhesive member extend around and correspond to an entire periphery of the rear side of the display panel and a front side of a light guide plate of the backlight unit.

2. The display device of claim 1, wherein the panel support member supports an edge of the rear surface.

3. The display device of claim 1, wherein as seen from a plan view of the display panel, the panel support member has a rectangular ring shape.

4. The display device of claim 1, wherein the magnetic adhesive member is formed at an edge of a top of the backlight unit and when as seen from a plan view of the display panel, the magnetic adhesive member has a rectangular ring shape.

5. The display device of claim 1, wherein the panel support member comprises:
   a first panel support member disposed between the display panel and the backlight unit;

a second panel support member spaced apart from the first panel support member;

a third panel support member connected to the first panel support member and the second panel support member; and a fourth panel support member spaced apart from the third panel support member.

6. The display device of claim 5, wherein the magnetic adhesive member comprises:

a first magnetic adhesive member contacting the first panel support member;

a second magnetic adhesive member contacting the second panel support member and spaced apart from the first magnetic adhesive member;

a third magnetic adhesive member contacting the third panel support member and connected to the first magnetic adhesive member and the second magnetic adhesive member; and a fourth magnetic adhesive member contacting the fourth panel support member and spaced apart from the third magnetic adhesive member.

7. The display device of claim 1, wherein the panel support member comprises a plurality of sub panel support members disposed between the display panel and the backlight unit and spaced apart from each other.

8. The display device of claim 1, wherein the panel support member comprises:

a panel support bottom part formed at a lower part of the display panel; and a panel support side part vertically connected to the panel support bottom part and covering a side of the display panel.

9. The display device of claim 1, further comprising a mold frame disposed between the display panel and the backlight unit, wherein the magnetic adhesive member is disposed on the mold frame.

10. The display device of claim 1, further comprising a bottom chassis formed at a lower part of the backlight unit and receiving the backlight unit, wherein the magnetic adhesive member is disposed on the bottom chassis.

11. The display device of claim 1, further comprising a panel adhesive member allowing the display panel and the panel support member to adhere to each other.

12. The display device of claim 1, wherein the panel support member is a conductor.

13. The display device of claim 1, wherein the panel support member comprises metal.

14. The display device of claim 8, wherein the panel support bottom part and the panel support side part are comprised of a same material, and constitute a single integrated monolithic unit.

15. A display device, comprising:

a display panel including a display surface that displays an image and is exposed to the outside and a rear surface that is opposed to the display surface;

a backlight unit formed at a lower part of the display panel and providing light to the display panel;

a panel support member disposed between the display panel and the backlight unit and supporting an edge of the display panel; and a magnetic adhesive member disposed between the panel support member and the backlight unit and having magnetism, wherein the magnetic adhesive member is a magnet, wherein the backlight unit includes a light guide plate, wherein each of the magnetic adhesive member and the panel support member are interposed between the light guide plate and the display panel, wherein a line extending perpendicularly from opposing major surfaces of the display panel near a periphery of the display panel and the backlight unit passes through both the magnetic adhesive member and the panel support member.

* * * * *